United States Patent
Lee et al.

(10) Patent No.: US 8,602,626 B2
(45) Date of Patent: Dec. 10, 2013

(54) LED LIGHT SOURCE MODULE AND DISPLAY APPARATUS INCLUDING THE SAME

(75) Inventors: Won Joon Lee, Seoul (KR); Kun Yoo Ko, Gyeonggi-do (KR); Jin Mo Kim, Gyeonggi-do (KR); Seung Hwan Choi, Gyeonggi-do (KR)

(73) Assignee: Samsung Electronics Co., Ltd., Seoul (KR)

( * ) Notice: Subject to any disclaimer, the term of this patent is extended or adjusted under 35 U.S.C. 154(b) by 82 days.

(21) Appl. No.: 13/328,564

(22) Filed: Dec. 16, 2011

(65) Prior Publication Data

US 2012/0155063 A1   Jun. 21, 2012

(30) Foreign Application Priority Data

Dec. 17, 2010   (KR) .......................... 10-2010-0130324

(51) Int. Cl.
   *F21V 8/00*   (2006.01)
(52) U.S. Cl.
   USPC .......................................... 362/612; 362/97.3
(58) Field of Classification Search
   USPC ................................................ 362/612, 97.3
   See application file for complete search history.

(56) References Cited

U.S. PATENT DOCUMENTS

| | | | |
|---|---|---|---|
| 5,564,819 | A | 10/1996 | Yamaguchi |
| 2006/0146297 | A1* | 7/2006 | Lee ................................. 353/99 |
| 2008/0165551 | A1* | 7/2008 | Okada et al. .................. 362/613 |

FOREIGN PATENT DOCUMENTS

| | | |
|---|---|---|
| EP | 2 085 683 A1 | 8/2009 |
| JP | 61-212076 | 9/1986 |
| JP | 2000-211186 | 8/2000 |
| JP | 2006-134661 | 5/2005 |
| KR | 10-0677551 | 2/2007 |
| WO | WO 03/006876 | 1/2003 |
| WO | WO 2009/155866 | 12/2009 |

OTHER PUBLICATIONS

European Search Report issued in European Patent Application No. 11194078.8 dated Apr. 4, 2012.

* cited by examiner

*Primary Examiner* — David V Bruce
(74) *Attorney, Agent, or Firm* — McDermott Will & Emery LLP

(57) ABSTRACT

An LED light source module is provided. The LED light source module includes a circuit board having a first circuit pattern and a second circuit pattern; and a plurality of rectangular LED packages mounted on the circuit board so as to be connected to each of the first and second circuit patterns, and arranged in a row such that each of the LED packages is tilted in a predetermined direction, while long sides of adjacent LED packages facing each other. In addition, a display device having the LED light source module is provided.

7 Claims, 3 Drawing Sheets

LED LIGHT SOURCE MODULE AND DISPLAY APPARATUS INCLUDING THE SAME

CROSS-REFERENCE TO RELATED APPLICATIONS

This application claims the priority of Korean Patent Application No. 10-2010-0130324 filed on Dec. 17, 2010, in the Korean Intellectual Property Office, the disclosure of which is incorporated herein by reference.

BACKGROUND OF THE INVENTION

1. Field of the Invention

The present invention relates to an LED light source module, and more particularly, to an LED light source module which can be used for a backlight unit, and a display device including the same.

2. Description of the Related Art

In general, various electronic devices, such as a personal digital assistant, a digital camera, a notebook computer, a monitor, a TV, or the like, include a display device for displaying an image, and particularly, among these kinds of display devices, a liquid crystal display (LCD) has been widely used.

In the case of the display device, for example, the LCD display may include a backlight unit having a light source module providing light. As the light source module, an LED light source module providing high luminance, while requiring a low level of driving voltage and low power consumption has been widely used.

The LED light source module may include a plurality of LED packages as a light source, and a circuit board on which the LED packages are mounted, such as a printed circuit board (PCB). The light source module employed in an edge type backlight unit (BLU) structure may mainly have a bar-shaped circuit board. In this case, the plurality of LED packages may be mounded in a row on the circuit board in the length direction of the circuit board.

In general, the luminance of the LED light source module may be adjusted by the number of LED packages contained therein. However, since the area of the circuit board on which the LED package is mounted is limited, the number of the mounted LED chips may be also restricted. Moreover, an LED chip of which a driving voltage is adjusted to the driving voltage of the LED package and of which luminance is improved may be used; however, defects such as degrading the lifespan of the LED chip or causing the design-modification of the entire configuration of the LED package may occur.

SUMMARY OF THE INVENTION

An aspect of the present invention provides an LED light source module having improved luminance by increasing the number of LED packages capable of being mounted on the limited area of a circuit board.

An aspect of the present invention also provides a display device employing the LED light source module.

According to an aspect of the present invention, there is provided an LED light source module, including: a circuit board having a first circuit pattern and a second circuit pattern; and a plurality of rectangular LED packages mounted on the circuit board so as to be connected to each of the first and second circuit patterns, and arranged in a row such that each of the LED packages is tilted toward a predetermined direction, while long sides of adjacent LED packages facing each other.

The plurality of rectangular LED packages may have light emitting windows disposed in surfaces opposite to mounting surfaces thereof. In this case, the plurality of rectangular LED packages may be arranged such that portions of light emitting windows of the adjacent LED packages are overlapped with each other in a direction perpendicular to an arrangement direction thereof.

The plurality of rectangular LED packages may be arranged to individually have the same distance, while being tilted at the same angle. The long sides of the rectangular LED packages may have a length smaller than a width of the circuit board.

According to another aspect of the present invention, there is provided display device, including: a display panel; and a backlight unit including an LED light source module, wherein the LED light source module includes a circuit board having a first circuit pattern and a second circuit pattern; and a plurality of rectangular LED packages mounted on the circuit board so as to be connected to each of the first and second circuit patterns, and arranged in a row such that each of the LED packages are inclined in a predetermined direction, while long sides of adjacent LED packages facing each other.

The plurality of rectangular LED packages may have light emitting windows disposed in surfaces opposite to mounting surfaces thereof. In this case, the plurality of rectangular LED packages may be arranged such that portions of light emitting windows of the adjacent LED packages are overlapped with each other in a direction perpendicular to an arrangement direction thereof.

The display device may further include a driving circuit unit for driving the LED light source module. The display device may be an LCD display device.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

Figure 1:
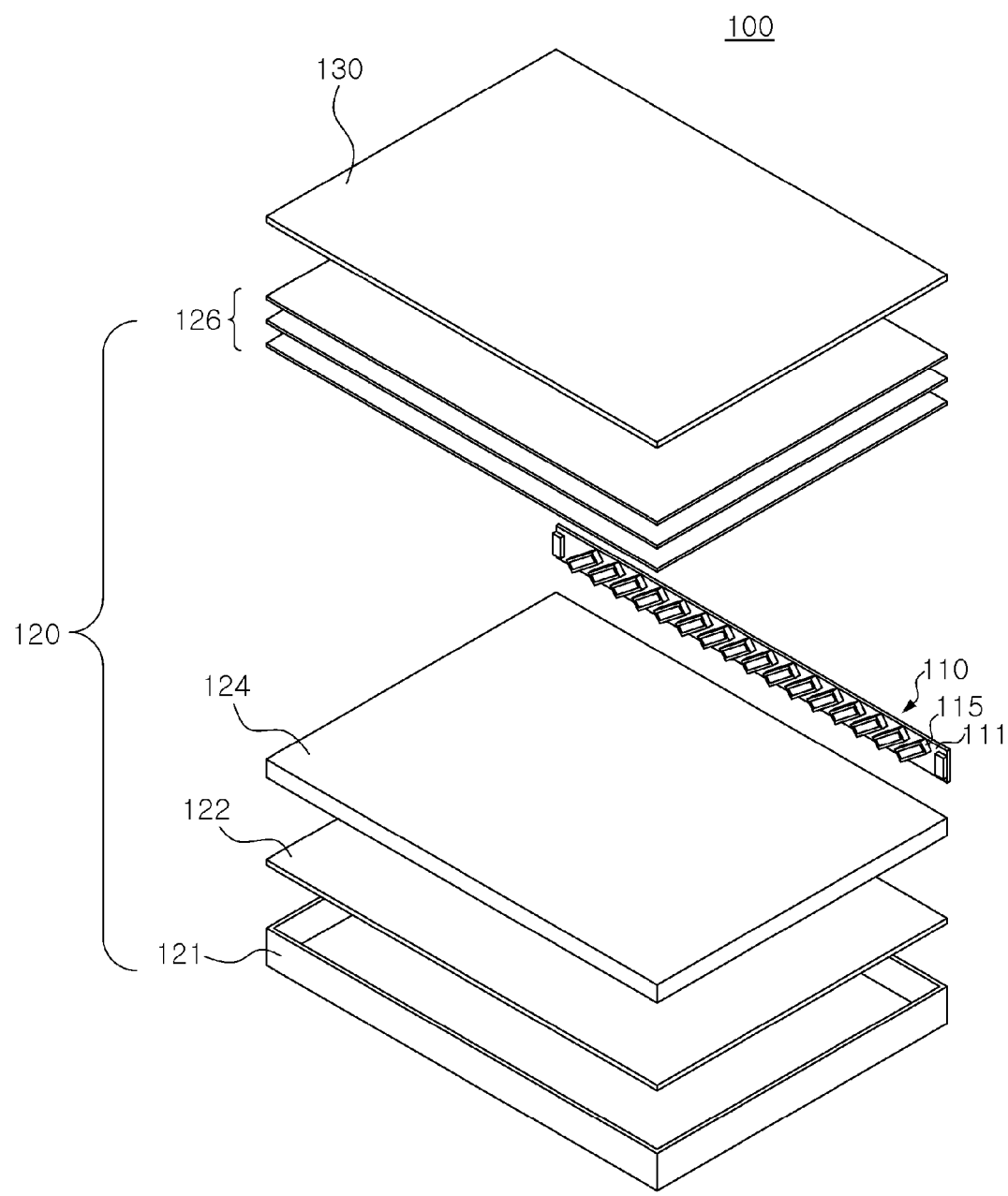
FIG. 1 is an exploded perspective view of an example of a display device according to an exemplary embodiment of the present invention.

FIG. 1 is an exploded perspective view of an example of a display device according to an exemplary embodiment of the present invention.

A display device 100 shown in FIG. 1 may include a backlight unit 120 and an image display panel 130, for example, a liquid crystal panel. The backlight unit may include a light emitting diode (LED) light source module 110 provided on at least one side thereof.

In the exemplary embodiment of the present invention, as shown in FIG. 1, the backlight unit 120 may further include a bottom case 121, a light guide plate 124, and a reflection plate 122 located below the light guide plate 124.

In addition, according to demands for various optical properties, various types of optical sheet 126, such as a diffusion sheet, a prism sheet, or protection sheet may be included between the light guiding plate 124 and the image display panel 130, for example, the liquid crystal panel.

The LED light source module 110 may be provided on a side of the light guide plate 124. While the LED light source module 110 is exemplarily provided in an edge type BLU and disposed on at least a side of the light guide plate in the exemplary embodiment of the present invention, the LED light source module 110 is not limited thereto. The LED light source module 110 may be provided on a plurality of sides, such as two opposing sides of the light guide plate, and may be used a light source in a structure in which light proceeds directly from a bottom surface to a top surface by employing a diffusion plate structure, like a direct type BLU.

Figure 2:
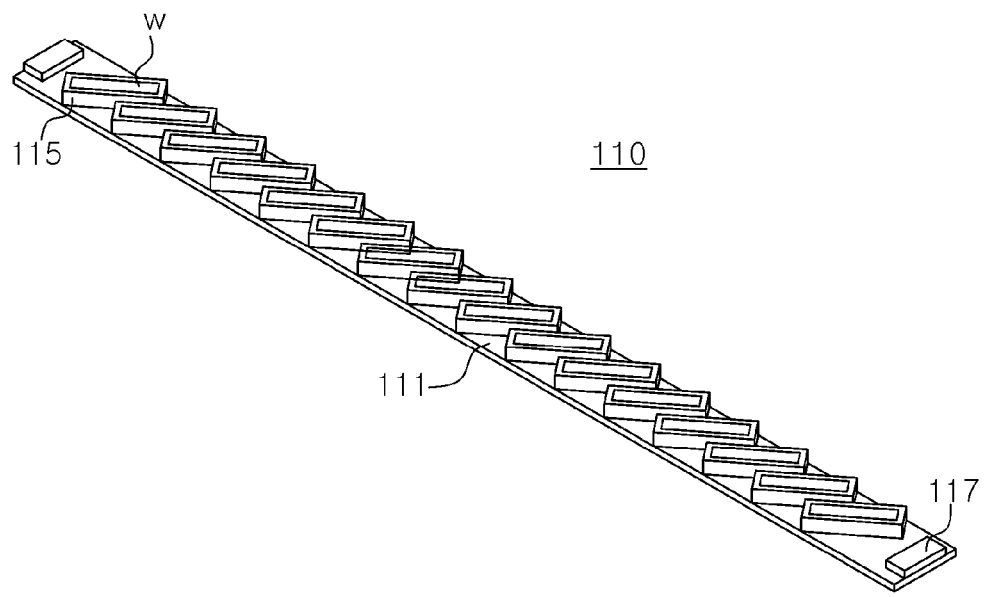
FIG. 2 is a perspective view of an LED light source module employed in the display device of FIG. 1 according to the exemplary embodiment of the present invention.

As shown in FIG. 1, the LED light source module 111 may include a circuit board 111 and a plurality of LED packages 115 mounted on the circuit board 111. Referring to FIG. 2, the LED light source module 110 shown in FIG. 1 may be illustrated in detail.

As illustrated in FIG. 2, a plurality of rectangular LED packages may have light emitting windows W disposed in surfaces opposite to mounting surfaces thereof. Each of the LED packages 115 may be a rectangular structure having two long sides and two short sides, respectively opposing each other when viewed from above.

Although not illustrated in the circuit board 111, the circuit board 111 may have first and second circuit patterns, each being connected to the LED package 115 to supply power. Also, the circuit board 111 may include a connector 117 which may be connected with an external power supply circuit so as to supply power through the first and second circuit patterns.

In the LED light source module 110 employed in the exemplary embodiment of the present invention, as shown in FIG. 2, the plurality of rectangular LED packages 115 may be arranged such that each of the LED packages is tilted toward a certain direction and long sides of adjacent LED packages face each other.

In this manner, the long sides of the LED packages are arranged to be inclined in the arrangement direction of the LED packages, whereby a relatively large number of LED packages 115 may be more efficiently disposed on the limited area of the circuit board 111, and further, the number of LED packages mounted on the circuit board 111 may be increased, thereby enhancing the luminance of the LED light source module.

In addition, this tilted arrangement may be effectively mounted on a circuit board having a width smaller than the long side length of the LED package.

Various arrangements of LED packages according to the present invention will be explained with reference to FIGS. 3 and 4.

Figure 3:
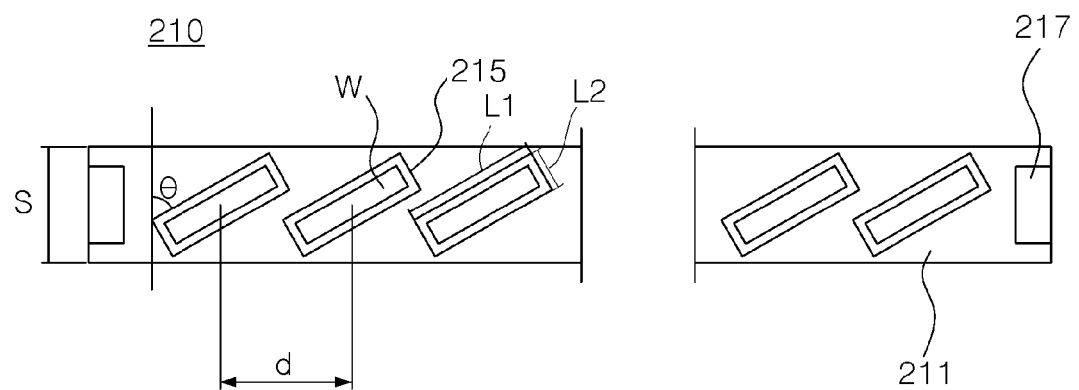
FIG. 3 is a top plan view of an LED light source module according to an exemplary embodiment of the present invention.

As shown in FIG. 3, a LED light source module 210 according to an exemplary embodiment of the present invention may include a circuit board 211 and a plurality of LED packages 215 mounted on the circuit board 211, similarly to the embodiment shown in FIG. 2.

The plurality of rectangular LED packages 215 may have light emitting windows W disposed in surfaces opposite to mounting surfaces thereof, and each LED package may be a rectangular structure having two long sides L1 and two short sides L2, respectively opposing each other when viewed from above.

The circuit board 211 may have first and second circuit patterns (not shown) each connected to the plurality of LED packages 215 to supply power thereto, and may include a connector 217 which may be connected with an external circuit so as to supply power through the first and second circuit patterns (not shown).

The LED packages 215 are arranged such that the long sides of the LED packages 215 may be tilted at a predetermined angle θ with respect to the width direction of the circuit board 211. In this arrangement, LED packages 215 may be disposed such that a distance d between the centers of adjacent LED packages 215 may be smaller than the long side length of the LED package.

Thus, a compact arrangement may be realized, as compared to an arrangement in which the short sides of the LED packages are arranged to face each other according to the long sides thereof, (in this case, the distance between the centers of adjacent LED packages is at least greater than L1).

Moreover, the LED packages 215 employed in the exemplary embodiment of the present invention may have the length of the long side L1 greater than a width S of the circuit board 211.

Figure 4:
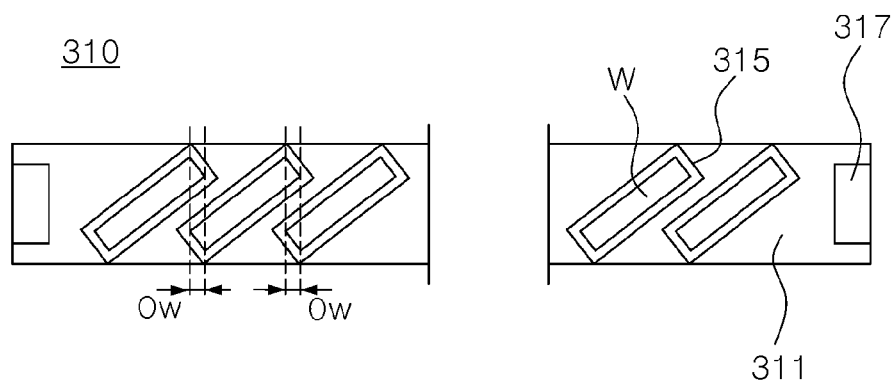
FIG. 4 is a top plan view of an LED light source module according to another exemplary embodiment of the present invention.

FIG. 4 is a top plan view of an LED light source module according to another exemplary embodiment of the present invention.

An LED light source module 310 shown in FIG. 4 may include a circuit board 311 and a plurality of LED packages 315 mounted on the circuit board 311, similarly to the manner of the foregoing exemplary embodiment.

The plurality of rectangular LED packages 315 may have light emitting windows W disposed in surfaces opposite to mounting surfaces thereof, and each LED package may be a rectangular structure having two long sides and two short sides, respectively opposing each other when viewed from above.

The circuit board 311 may have first and second circuit patterns (not shown) each connected to the plurality of LED packages 215 to supply power thereto, and a connector 317.

In this exemplary embodiment of the present invention, adjacent LED packages 315 are arranged such that at least portions of light emitting windows W of adjacent LED packages 315 are overlapped with each other in the width direction of the circuit board 311 (a direction perpendicular to a arrangement direction thereof).

Through this arrangement, a more compact arrangement may be realized, whereby luminance per area of the circuit board 311 may be effectively improved, as well as the number of LED packages 315 mounted on the circuit board increased.

In this manner, adjacent LED packages 315 are arranged to be overlapped with each other in the width direction of the circuit board 311, whereby the luminance of the LED light source module may be greatly improved.

In a particular exemplary embodiment of the present invention, an LED package having another structure may also be advantageously applied. For example, while a top surface-emission type LED package structure is exemplarily illustrated in the exemplary embodiments shown in FIGS. 1 through 4, a side-emission type LED package structure having a light emitting window on a side adjacent to amounting surface thereof may be similarly applied.

Figure 5:
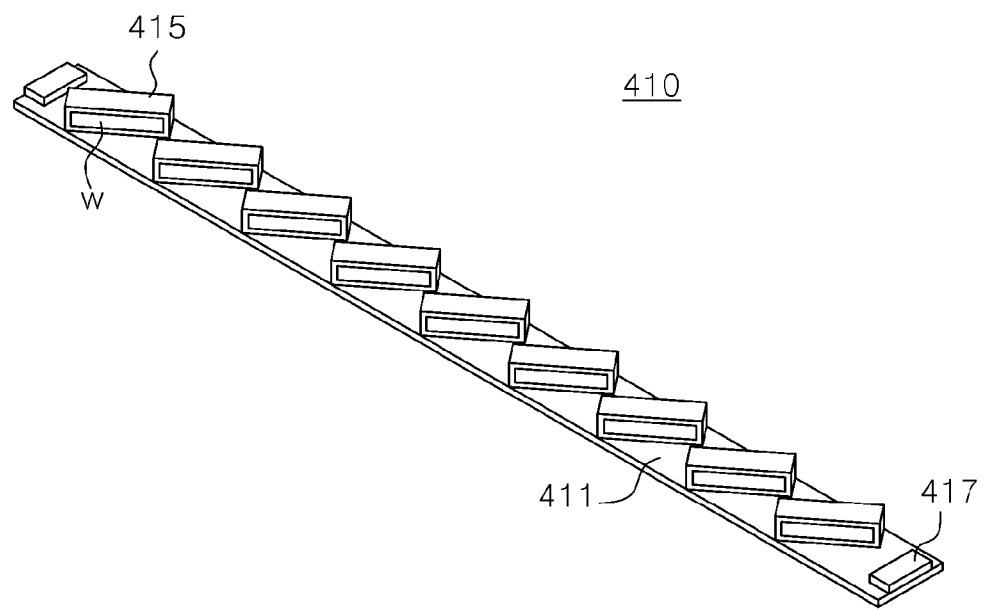
FIG. 5 is a perspective view of an LED light source module according to another exemplary embodiment (an example of a side-emission type LED package) of the present invention.

An LED light source module 410 shown in FIG. 5 may include a circuit board 411, and a plurality of LED packages 415 mounted on the circuit board 411. The circuit board 411 may have first and second circuit patterns (not shown) each connected to the plurality of LED packages 415 to supply power thereto, and a connector 417.

The plurality of rectangular LED packages 415 may have light emitting windows W disposed in surfaces opposite to mounting surfaces thereof. In this exemplary embodiment of the present invention, the LED packages 415 are also arranged such that the long sides of the LED packages 415 may be tilted at a predetermined angle θ with respect to the width direction of the circuit board 411, similarly to in FIGS. 2 and 3.

In this arrangement, LED packages 415 may be disposed such that a distance between the centers of adjacent LED packages 415 may be smaller than the long side length of the LED package. The LED packages 415 may be arranged so as not to overlap with each other such that light emitted from the light emitting window of each LED package is not blocked by adjacent LED packages.

As shown and explained in FIG. 1, the LED light source module may be applied to various kinds of display device, and further may be also advantageously applied to an illumination device.

As set forth above, according to exemplary embodiments of the present invention, the number of LED packages employed in an LED light source module could be increased by mounting a plurality of rectangular LED packages on a circuit board in such a manner that the long sides of adjacent LED packages are tilted toward a certain direction, while facing each other. In particular, adjacent LED packages are disposed so as to overlap with each other in the width direction of circuit board, whereby the luminance of the LED light source module could be greatly improved.

In addition, in the case in which the width of the circuit board is smaller than the long side of the LED package, this arrangement may be employed as a structure capable of efficiently disposing the LED packages on the circuit board.

While the present invention has been shown and described in connection with the exemplary embodiments, it will be apparent to those skilled in the art that modifications and variations can be made without departing from the spirit and scope of the invention as defined by the appended claims.

What is claimed is:

1. A light emitting diode (LED light source module, comprising:
    a circuit board having a first circuit pattern and a second circuit pattern; and
    a plurality of rectangular LED packages mounted on the circuit board so as to be electrically connected to each of the first and second circuit patterns, and arranged in a single row in the LED light source module such that each of the LED packages is tilted toward a predetermined direction, while long sides of adjacent LED packages facing each other,
    wherein:
    each rectangular LED package includes a light emitting window disposed in a surface opposite to a mounting surface thereof,
    the plurality of rectangular LED packages are arranged such that portions of light emitting windows of the adjacent LED packages overlap with each other in a direction perpendicular to an arrangement direction thereof, and
    the long sides of the rectangular LED packages each have a length greater than a width of the circuit board.

2. The LED light source module of claim 1, wherein the plurality of rectangular LED packages are arranged to individually have the same distance, while being titled at the same angle.

3. A display device, comprising:
    a display panel; and
    a backlight unit including a light emitting diode (LED) light source module,
    wherein:
    the LED light source module includes a circuit board having a first circuit pattern and a second circuit pattern;
    a plurality of rectangular LED packages are mounted on the circuit board so as to be electrically connected to each of the first and second circuit patterns, and arranged in a single row in the LED light source module such that each of the LED packages is tilted toward a predetermined direction, while long sides of adjacent LED packages facing each other;
    each rectangular LED package includes a light emitting window disposed in a surface opposite to a mounting surface thereof;
    the plurality of rectangular LED packages are arranged such that portions of light emitting windows of the adjacent LED packages overlap with each other in a direction perpendicular to an arrangement direction thereof; and
    the long sides of the rectangular LED packages each have a length greater than a width of the circuit board.

4. The display device of claim 3, wherein the plurality of rectangular LED packages are arranged to individually have the same distance, while being tilted at the same angle.

5. The display device of claim 3, wherein the display device further includes a driving circuit unit for driving the LED light source module.

6. The display device of claim 3, wherein the display device is an LCD display device.

7. A light emitting diode (LED) light source module, comprising:
    a circuit board having a first circuit pattern and a second circuit pattern; and
    a plurality of rectangular LED packages mounted on the circuit board so as to be electrically connected to each of the first and second circuit patterns, and arranged in a single row in the LED light source module such that each of the LED packages is tilted toward a predetermined direction, while long sides of adjacent LED packages facing each other,
    wherein the long sides of the rectangular LED packages each have a length greater than a width of the circuit board.

* * * * *